United States Patent [19]

Schneider et al.

[11] 4,062,213

[45] Dec. 13, 1977

[54] CONTROL SYSTEM FOR THE INITIATION AND/OR TERMINATION OF OPERATING STEPS OF PERFORATING, PUNCHING, CUTTING AND SHAPING PRESSES

[75] Inventors: Franz Schneider; Helmut Braitinger, both of Goeppingen, Germany

[73] Assignee: L. Schuler GmbH, Germany

[21] Appl. No.: 725,723

[22] Filed: Sept. 23, 1976

[30] Foreign Application Priority Data

Oct. 13, 1975 Germany .............................. 2545764

[51] Int. Cl.$^2$ .............................................. B21J 7/46
[52] U.S. Cl. ........................................ 72/24; 72/21; 83/72; 100/43
[58] Field of Search ................. 100/43, 48; 83/71, 72; 72/21, 22, 23, 24, 25

[56] References Cited

U.S. PATENT DOCUMENTS

| | | | |
|---|---|---|---|
| 3,407,724 | 10/1968 | Heiberger | 100/43 |
| 3,450,912 | 6/1969 | LaVallee | 100/43 |
| 3,504,512 | 4/1970 | Knowles | 72/22 |
| 3,690,133 | 9/1972 | Hilgers | 72/24 |

Primary Examiner—Lowell A. Larson
Attorney, Agent, or Firm—Craig & Antonelli

[57] ABSTRACT

A control system for controlling operating steps of a press including a coded pulse generator for providing a coded pulse output in dependence upon the position of a drive shaft of a press drive and a signal generator responsive to the stroke rate of the press for providing an output signal proportional to the stroke rate of the press. A summing unit receives the coded pulse output from the coded pulse generator and the output signal of the signal generator for providing a corrected coded pulse output. A decoding unit is provided for decoding the corrected coded pulse output of the summing unit and for supplying a decoded pulse output to a pulse distributor which provides an output on at least one of a plurality of output paths in accordance with the decoded output of the decoding unit. At least one regulating member for controlling an operating step is coupled to the pulse distributor for receiving an output therefrom in accordance with the position of the drive shaft and the stroke rate of the press.

15 Claims, 1 Drawing Figure

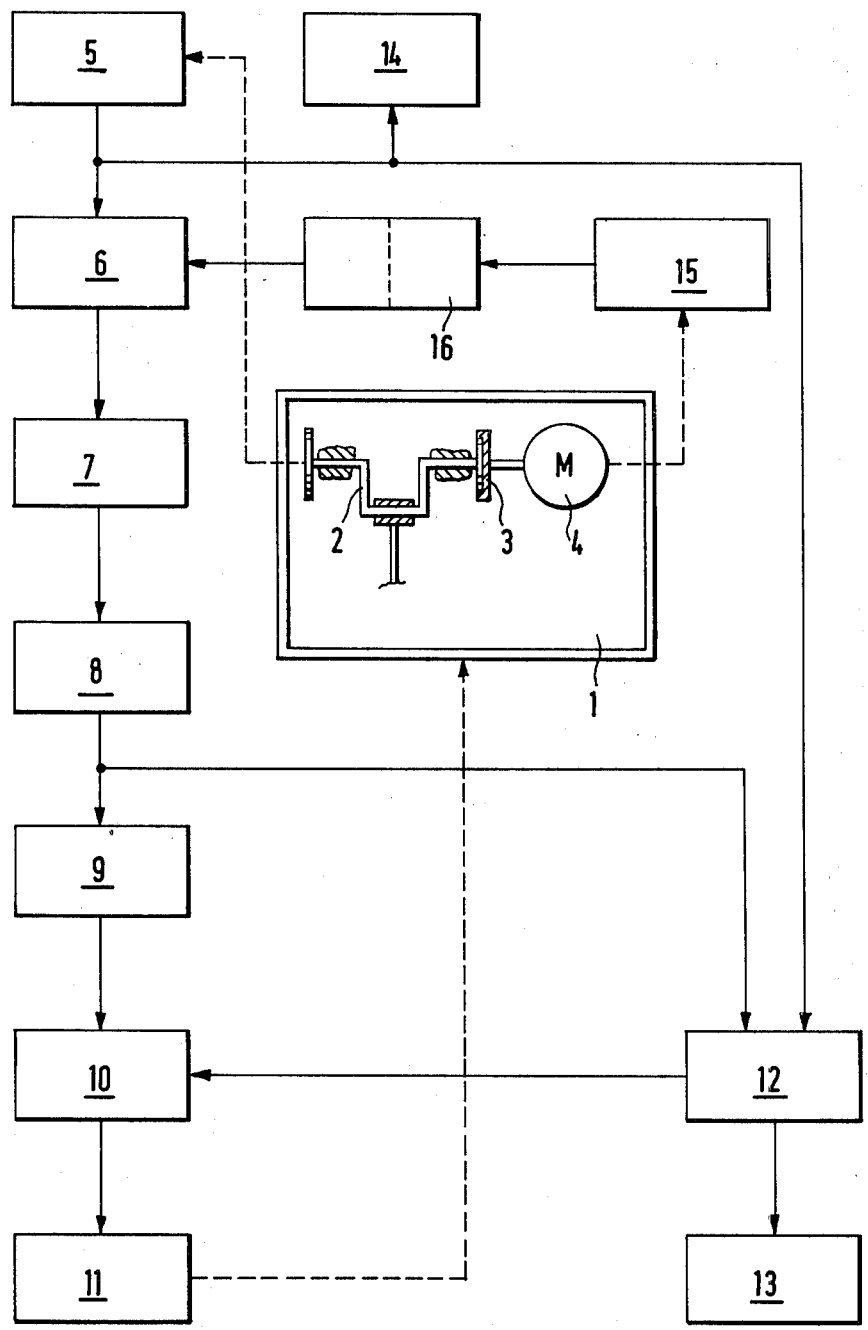

CONTROL SYSTEM FOR THE INITIATION AND/OR TERMINATION OF OPERATING STEPS OF PERFORATING, PUNCHING, CUTTING AND SHAPING PRESSES

The present invention relates to a control system for the initiation and/or termination of operating steps of perforating, punching, cutting, and/or shaping presses wherein a pulse generator provides output pulses in dependence on the position of a drive shaft of a drive mechanism for the press, the pulses being transmitted through a pulse distributor to appropriate regulating members for controlling the operating steps.

Such control systems serve for the generation and processing of control signals for operating steps of mechanization, transfer, and/or automating devices and/or controlled tools pertaining to presses. If presses equipped in this way are operated at a variable stroke rate, the necessity arises to affect the control system and/or the control signals in dependence on the stroke rate, in order to obtain a safe mode of operation, so that the operating steps are initiated and terminated at the correct point in time. Since the regulating members, for example valves, of the mechanization, transfer and/or automation devices generally exhibit constant switching times, it is necessary in case of high stroke rates of the press to feed the control pulses to the regulating members at an earlier point in time as compared to the procedure at low stroke rates.

For this purpose, it is known (German Utility Model 7,337,206) to utilize a pulse generator to produce the control pulses which pulse generator is adjusted in its phase relationship with respect to the drive shaft of the press drive mechanism manually or by means of a stepping motor when the stroke rate of the press is changed.

In such a mechanical and/or electromechanical solution, besides having to use parts susceptible to wear and tear, a safe functioning is only ensured within the respectively preselected stroke rate range; in other words, an automatic adaptation of the control pulse generation to the respective stroke rates of the presses, especially also during the accelerating period in synchronized press lines, is impossible.

It is therefore an object of the present invention to overcome the drawbacks of the prior art by providing a control system for automatically adapting the generation of the control pulses to the respective stroke rates of a press.

In accordance with the present invention, there is provided a control system utilizing a coded pulse generator or encoder which provides a coded pulse output corresponding to the position of a drive shaft of a press drive mechanism and a signal generator arrangement which provides an output signal proportional to the stroke rate of the press. A summing circuit receives the outputs of the signal generator arrangement and the coded pulse generator and provides a corrected pulse signal output to a decoder. The output of the decoder is then transmitted via a presettable control pulse distributor to regulating members for the initiation and/or termination of the operating steps.

According to features of the present invention, the signal generator arrangement may be integrated into the coded pulse generator or connected to the press drive mechanism independently of the coded pulse generator. The signal generator arangement, when provided independently of the coded pulse generator, includes a tachometer generator in operative connection with the press drive mechanism providing an output to an analog-to-digital converter which provides an output to the summing circuit.

In accordance with further features of the present invention, the analog-to-digital converter includes a circuit which associates quasiconstant, coded adjustable correction values with the output signal of the tachometer generator proportional to the stroke of the press or includes a circuit with limit value indicators for defining preselectable stroke rate ranges and which associates with each stroke rate range a multipliable, adjustable correction value.

The present invention thus has the advantage of being made up of components which are wearproof and service-free, since electronic components operating in a non-contactual way are utilized which furthermore require only a small amount of space. An absolute positional indication of the press ram is made possible. Furthermore, the correction values to be associated therewith can be preselected with any desired degree of sensitivity and can also be readily varied subsequently, thus attaining a resolution of any desired magnitude.

These and other objects, features and advantages will become apparent from the following description taken in conjunction with the single figure of drawing which is a block circuit diagram of the control system in accordance with the present invention.

Referring now to the single FIGURE, there is schematically illustrated a press 1 comprising a crankshaft 2 which can be connected by way of a clutch 3 with a flywheel to a drive motor 4 and constitutes the drive mechanism for the press. The crankshaft 2 is in operative connection with a pulse generator 5 of a coded design, whereby the crank circle of the crankshaft 2 of the press 1 can be reproduced with any desired degree of sensitivity in the form of coded control pulses. The coded control pulses from the pulse generator 5 are supplied to a decoder 7 via a summing circuit 6, wherein coded correction values can be added. A signal amplifier 8 is connected to the output of the decoder 7, and the decoded control signals are fed via this amplifier to a control pulse distributor designed as a crossbar distributor 9. From the crossbar distributor 9, the decoded control pulses are supplied to a power amplifier 10 provided with a storage unit which provides an output of the control pulses to regulating members 11 associated, for example, with a mechanization, transfer and/or automation device and/or with controlled tools. For the sake of simplicity, only one regulating member 11 is shown in the illustrated embodiment with the operative connection thereof to the press being schematically indicated.

A monitoring circuit 12 is also provided which is fed with the coded control pulses directly from the pulse generator 5 and with the decoded and amplified control pulses present at the input of the crossbar distributor 9. The monitoring circuit 12 detects erroneously coded and/or decoded control pulses and/or any control pulses which are missing outright. As soon as an error occurs, the monitoring circuit 12 deactivates the power amplifier 10 so that the regulating members 11 are no longer actuated. Customarily, the press 1 and/or the drive motor 4 are likewise turned off in case of a disturbance. A fault signalling device 13 connected to the monitoring circuit 12 indicates the disturbance, for example optically by means of lamps and/or acoustically by means of a signalling horn. The monitoring circuit 12 also determines whether all of the switching paths required for the resetting of the regulating members 11 have been established in the crossbar distributor 9. This is achieved by applying to the switching paths for the control pulses for resetting the regulating members 11 a signal, e.g. a voltage, in the rest position. If this signal is not present, the regulating members 11 then cannot be actuated.

The fault signalling device 13 contains, inter alia, a switching unit which is turned on only if all operating voltages required for the operation of the control circuit are present. If any one of these operating voltages is missing, the press 1, including the mechanization, transfer, and/or automation device, cannot be placed into operation and/or the press 1 and the associated devices are arrested.

By the coded design of the pulse generator 5, it is possible, if required, to effect a high resolution of a crank circle comprising 360°. For this purpose, a pulse generator 5 can be advantageously employed which is made up of a disk provided with concentrically applied pulse markings, coded in correspondence with the selected code. The pulse markings are scanned suitably by means of opto-electronic components, i.e. light-emitting diodes and photosensitive semiconductors.

Upon an increase in the stroke rate of the press 1, the control pulses become shorter, as is known, and the response times of electromechanical storage elements, for example self-holding relays or contactors of conventional control circuits, are too long for such components to respond. Thus, the regulating members 11 can no longer be operated, and functioning failures of the press 1 and/or the associated device to be controlled are the result. To avoid this deficiency, an electronic storage or buffer unit is associated with the power amplifier 10, making it possible advantageously to increase the stroke rate of a press 1, since the response times of the electronic storage unit are much shorter than those of the heretofore employed electromechanical storage elements.

As shown in the drawing, a signal generator with a tachometer generator 15 is in operative connection with the press drive mechanism 2, 3, 4 and provides an output signal proportional to the stroke rate of the press 1. This output signal is fed to an analog-to-digital converter 16 which produces coded, adjustable correction values in correspondence with the code of the pulse generator 5. From the output of the analog-to-digital converter 16, the coded correction values are supplied to the summing circuit 6 wherein they are, with the correct arithmetic sign, either added to the coded control pulses or subtracted from the coded control pulses.

For purposes of this description, it is assumed that the summing circuit 6 operates as a subtracting unit, so that the maximum correction takes place at the lowest stroke rate of the press 1, whereas no correction is required at the highest stroke rate of the press.

The output signal of the tachometer generator 15, produced at the lowest stroke rate, is associated in the analog-to-digital converter 16 with the coded maximum correction value and then fed to the summing circuit 6. Since the regulating members 11, as described hereinabove, have almost constant switching times, the control pulses based on the traversed angle of the crankshaft 2 must become effective at low stroke rates at a later point in time as compared to high stroke rates in order to ensure a flawless functioning of the mechanization, transfer and/or automation devices and/or of the controlled tool. As a consequence, a regulating member 11 operated at the maximum stroke rate, i.e. for example at a crank angle of 30°, is to be actuated at the lowest stroke rate, for example, only at a crankshaft angle of 70°. As a consequence, furthermore, the associated coded, maximum correction value must correspond to a crankshaft angle of 40° which is subtracted from the coded control pulses supplied by the pulse generator 5. Thereby, the regulating member 11 is indeed only operated at a crankshaft angle of 70°. With an increasing stroke rate, the regulating member 11 must be operated at an ever earlier point in time, so that the respective correction value to be subtracted becomes increasingly smaller and is zero at the maximum stroke rate. The analog-to-digital converter 16 includes a circuit which associates quasi-constant, coded correction values with the output signal of the tachometer generator 15 variable with the stroke rate. The staggering of these coded correction values can be adjusted and varied, and the maximally possible graduation thereof corresponds to the sensitivity and/or resolving power of the coded pulse generator 5. This results in a quasi-constant adaptation of the instant of operating the regulating members 11 to the respective stroke rate of the press 1.

A further arrangement resides in subdividing the range between the smallest and the maximum stroke rate into several stroke rate ranges and to associate with each of the stroke rate ranges a preselectable, adjustable coded correction value. This results in a relatively roughly graduated correction which, however, can be considered sufficient in many applications, especially since the detection of the stroke rate ranges is required also for other functions, for example to determine the braking effect during the arresting of the press 1.

To determine the stroke rate ranges, the analog-to-digital converter 16 includes limit value indicators to which is fed the output signal of the tachometer generator 15 dependent on the stroke rate. Within the scope of the example described hereinabove, the range between the minimum and maximum stroke rates encompasses correction values of 0° to 40°, so that this range can be subdivided, for example, into five stroke rate ranges. Consequently, the lowest stroke rate, for example 10 strokes per minute, is associated with the coded maximum correction value of 40°, while the subsequent stroke rate range of 11–13 strokes per minute is associated with a coded correction value of 30°, the stroke rate range of 14–17 strokes per minute is associated with a coded correction value of 20°, the stroke rate range of 18–20 strokes per minute is associated with a coded correction value of 10°, and stroke rates in excess of 20 strokes per minute are not associated with a correction value. These correction values, associated with the stroke rate ranges, are fed to the summing circuit 6 and subtracted as in the example described above from the coded pulses of the pulse generator 5, so that the regulating member 11 is operated at the correct point in time corresponding to the stroke rate of the press 1.

The limit value indicators may be constructed, for example, from electronic switches dependent on a threshold value, which change their switching position in dependence on the attained value of the output signal of the tachometer generator 15 and derive and transmit a preset, variable coded correction value, or pass on such correction value in an integrally multiplied manner in dependence on the number of switched, threshold-value-dependent switches. For example, the preset, coded correction value which corresponds to an angle of 10° is multiplied by 4 at the lowest stroke rate, tripled with an increasing stroke rate, doubled with a further increasing stroke rate, taken singly with a further increase in the stroke rate, and no longer applied at the maximum stroke rate.

The signal generator may also be contained directly or integral with the coded pulse generator 5, wherein for example digital, uncoded output signals are integrated, whereby an analog signal dependent on the stroke rate is obtained which is fed to the analog-to-digital converter 16 and further processed in the aforedescribed manner. Furthermore, the signal generator may be constructed of a coded design in correspondence with the coded pulse generator 5, so that the coded correction values corresponding to the stroke rate are fed directly to the summing circuit 6.

The various components of the control circuit may be constructed in a manner known in the art. For example, the coded pulse generator 5 and the tachometer generator 15 may be of the type manufactured by Unico, Inc., Racine, Wisconsin; the summing circuit 6 may be a Philco-Ford pL4A01C adder; the decoder 7 may be of the type described in Integrated Circuits Catalog from Texas Instruments, Aug. 1, 1969, at pages 5–7 and 5–9; the amplifier 8 may be of the type described in Cardlock Bulletin 1720, at page 28, Aug. 1971; the crossbar distributor may be of the type illustrated in British Pat. No. 1,223,862; the amplifying unit 10 includes an amplifier with a buffer storage unit of the type illustrated in the publication Schaltkreissytem SIMATIC N by Siemens, West Germany, Feb. 1971 at pages 2/14 and 2/18, the monitoring circuit 12 may be constructed in a manner known in the art from logic elements in the manner indicated in the publication SIMATIC N Static Switching System by Siemens, West Germany, Dec. 1972, at pages 53–55; the analog-to-digital converter 16 may be of the type described in the publication Series 40 and Series 50 Analog-To-Digital Converters, Burr-Brown Research Corp., June 1972; and the regulating member 11 may for example correspond to valve 119 in U.S. Pat. No. 3,080,983 or a cylinder-piston unit 68, 69 in U.S. Pat No. 3,061,118.

While we have shown and described a single embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A control system for controlling operating steps of a press means comprising coded pulse generator means for providing a coded pulse output in dependence upon the position of a drive shaft of a press drive means, signal generator means responsive to the stroke rate of the press means for providing an output signal proportional to the stroke rate of the press means, summing means receiving the coded pulse output from said coded pulse generator means and the output signal of said signal generator means for providing a corrected coded pulse output, decoding means for decoding the corrected coded pulse output of said summing means for supplying a decoded pulse output, pulse distributor means for providing an output on at least one of a plurality of output paths in accordance with the decoded output of said decoder means, and at least one regulating means for controlling an operating step being coupled to said pulse distributor means for receiving an output therefrom in accordance with the position of the drive shaft of the press means and the stroke rate of the press means.

2. A control system according to claim 1, wherein said signal generator means is integral with said coded pulse generator means.

3. A control system according to claim 1, wherein said signal generator means is coupled to said press drive means independently of the coupling of said coded pulse generator means to said press drive means.

4. A control system according to claim 3, wherein said signal generator means comprises tachometer generator means operatively connected with the press drive means and providing an analog output in accordance with the stroke rate of the press means, and analog-to-digital converter means for converting the analog output of the tachometer generator means to a digital output signal, said summing means receiving the digital output signal of said analog-to-digital converter means.

5. A control system according to claim 4, wherein said analog-to-digital converter means includes circuit means for associating quasi-constant, coded adjustable correction values with the analog output signal of said tachometer generator means proportional to the stroke rate of the press means.

6. A control system according to claim 4, wherein said analog-to-digital converter means includes limit value indicator means for defining preselectable stroke rate ranges.

7. A control system according to claim 6, wherein said analog-to-digit converter means further includes circuit means for associating with each stroke rate range determined by said limit value indicator means a multipliable, adjustable correction value.

8. A control system according to claim 4, wherein said summing means combines the coded pulse output of said coded pulse generating means and the digital output of said analog-to-digital converter means for providing the corrected coded pulse output.

9. A control system according to claim 4, wherein said regulating means includes amplifying means for amplifying the output of said pulse distributor means and a regulating member for receiving the amplified output of said pulse distributor means, said regulating member at least one of initiating and terminating an operating step in accordance therewith.

10. A control system according to claim 9, further comprising monitoring means for monitoring the operation of the control system, said monitoring means receiving the outputs of said coded pulse generating means and said decoder means and being connected with said amplifying means.

11. A control system according to claim 10, wherein said amplifying means includes a buffer storage means and an amplifier connected to said buffer storage means.

12. A control system according to claim 11, further comprising fault signalling means connected to said monitoring means, said fault signalling means providing an indication in response to the detection of improper operation by said monitoring means.

13. A control system according to claim 12, further comprising an amplifier connected between said decoding means and said pulse distributing means.

14. A control system according to claim 13, wherein said pulse distributor means is a crossbar distributor.

15. A control system according to claim 14, wherein the press means includes at least one of a perforating, punching, cutting and shaping press.

* * * * *